United States Patent
Fozooni et al.

(10) Patent No.: US 12,273,166 B2
(45) Date of Patent: Apr. 8, 2025

(54) REDUCING PEAK-TO-AVERAGE POWER RATIO IN MIMO COMMUNICATION SYSTEM

(71) Applicant: Telefonaktiebolaget LM Ericsson (publ), Stockholm (SE)

(72) Inventors: Milad Fozooni, Gothenburg (SE); Ulf Gustavsson, Gothenburg (SE); Roland Carlsson, Öjersjö (SE); Aare Mällo, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 38 days.

(21) Appl. No.: 18/285,243

(22) PCT Filed: Apr. 7, 2021

(86) PCT No.: PCT/SE2021/050312
§ 371 (c)(1),
(2) Date: Sep. 30, 2023

(87) PCT Pub. No.: WO2022/216187
PCT Pub. Date: Oct. 13, 2022

(65) Prior Publication Data
US 2024/0187054 A1    Jun. 6, 2024

(51) Int. Cl.
*H04B 7/0456*    (2017.01)
*H04L 27/26*    (2006.01)

(52) U.S. Cl.
CPC ....... *H04B 7/0465* (2013.01); *H04L 27/2624* (2013.01)

(58) Field of Classification Search
CPC .................... H04B 7/0465; H04L 27/2624
See application file for complete search history.

(56) References Cited

U.S. PATENT DOCUMENTS

| | | | |
|---|---|---|---|
| 2013/0188751 A1* | 7/2013 | Ohlmer | H04B 7/0417 375/296 |
| 2014/0071851 A1* | 3/2014 | Plainchault | H04B 7/024 370/254 |

(Continued)

FOREIGN PATENT DOCUMENTS

WO    2020191591 A1    10/2020

OTHER PUBLICATIONS

International Search Report and Written Opinion of the International Searching Authority, PCT/SE2021/050312, mailed Dec. 21, 2021, 8 pages.

(Continued)

*Primary Examiner* — Janice N Tieu
(74) *Attorney, Agent, or Firm* — Sage Patent Group (57) ABSTRACT

A method for reducing peak-to-average power ratio, PAPR, in a Multiple Input Multiple Output, MIMO, communication system is disclosed. The method is performed in a precoder unit and includes: confining, by a differentiable cost function, power of a MIMO signal to be between a lower threshold, $P_{low}$, and an upper threshold, $P_{up}$, and applying a gradient method on the differentiable cost function until reaching a set power target for the MIMO signal, while keeping an Error Vector Magnitude, EVM, below a set EVM level.

20 Claims, 5 Drawing Sheets

(56) References Cited

U.S. PATENT DOCUMENTS

2022/0190887 A1\* 6/2022 Wang ............... H04B 7/0426
2023/0388173 A1\* 11/2023 Cui ................. H04B 7/0617

OTHER PUBLICATIONS

Studer, Christoph et al., "Democratic Representations," arXiv:1401.3420v2, Apr. 21, 2015, 43 pages.
Parikh, Neal et al., "Proximal Algorithms," Foundations and Trends in Optimization, vol. 1, No. 3, 2013, pp. 123-231.

\* cited by examiner

REDUCING PEAK-TO-AVERAGE POWER RATIO IN MIMO COMMUNICATION SYSTEM

CROSS REFERENCE TO RELATED APPLICATIONS

This application is a 35 U.S.C. § 371 national stage application of PCT International Application No. PCT/SE2021/050312 filed on Apr. 7, 2021, the disclosure and content of which is incorporated by reference herein in its entirety.

TECHNICAL FIELD

The technology disclosed herein relates generally to the field of signal processing in wireless communication systems and in particular to methods and devices for reducing peak-to-average power ratio in MIMO systems.

BACKGROUND

Modern communication systems struggle with energy efficiency and nonlinearities in multicarrier signaling. A known way of combatting these difficulties is to use reduction of peak-to-average power ratio (PAPR), which in turn involves use of crest-factor reduction (CFR) techniques such as iterative clipping and filtering. However, the CFR techniques have drawbacks such as high computational complexity, latency and error vector magnitude (EVM) at a receiver side of a wireless connection.

A known technique for iteratively reducing the PAPR is Convex Reduction of Amplitudes (CRAM). CRAM works fairly well with a wide range of given data and channel inputs by simply tuning a few parameters. However, the tuning of fewer parameters may result in a less flexible algorithm in terms of convergence rate and total radiated power across antennas. In order to improve on energy efficiency and reduce nonlinearities in wireless communications systems there is a need for more flexible methods for reducing the PAPR.

SUMMARY

An objective of embodiments disclosed herein is to solve or at least alleviate at least one of the above-mentioned problems.

The objective is according to a first aspect achieved by a method for reducing PAPR in a Multiple Input Multiple Output (MIMO) communication system. The method is performed in a precoder unit and comprises confining power of a MIMO signal by a differentiable cost function. The method further comprises applying iteratively a gradient method on the differentiable cost function until reaching a set power target for the MIMO signal, while keeping an Error Vector Magnitude, EVM, below a set EVM level.

The objective is according to a second aspect achieved by a precoder unit for reducing PAPR in a MIMO communication system. The precoder unit is configured to confine power of a MIMO signal by a differentiable cost function. The precoder unit is further configured to apply iteratively a gradient method on the differentiable cost function until reaching a set power target for the MIMO signal, while keeping an Error Vector Magnitude, EVM, below a set EVM level.

The objective is according to a third aspect achieved by a precoder unit for reducing PAPR in a MIMO communication system. The precoder unit comprises a confine module configured to confine power of a MIMO signal by a differentiable cost function. The precoder unit further comprises an apply module configured to apply iteratively a gradient method on the differentiable cost function until reaching a set power target for the MIMO signal, while keeping an Error Vector Magnitude, EVM, below a set EVM level.

The objective is according to a fourth aspect achieved by an access network node. The access network node comprises a precoder unit according to the first aspect, according to the second aspect or according to the third aspect.

The objective is according to a fifth aspect achieved by a computer program for reducing PAPR in a MIMO communication system. The computer program comprises computer code which, when run on processing circuitry of a precoder unit, causes the precoder unit to perform a method according to the first aspect.

The objective is according to a sixth aspect achieved by a computer program product comprising a computer program according to the fifth aspect and a computer readable storage medium on which the computer program is stored. The computer readable storage medium may, for instance, be a non-transitory computer readable storage medium.

These aspects of the inventive concept provide several advantages. These aspects provide an efficient and flexible precoding. These aspects smoothly enable confining of high and small amplitudes of a signal into a desired range of amplitudes. These aspects enable skillful shaping of a signal, in particular a MIMO signal comprising a payload signal part and a control signal part. These aspects provide efficient precoding with reduced PAPR while keeping EVM at a desired level.

These aspects of the inventive concept may be utilized in a number of gradient-based optimization techniques for improving their convergence techniques and thereby achieve highly efficient and also flexible precoding. The differentiability of herein suggested cost functions enables the use of many different gradient-based optimization techniques.

Further objectives, features and advantages of the presented embodiments will be apparent upon reading the following description, claims and the accompanying drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

The CRAM uses a non-differentiable cost function, which is pinpointed by the present inventors as giving the high lack of flexibility, or at least being a large part of it. In an aspect, a method disclosed herein in various embodiments utilizes a soft clipping in contrast to the hard clipping used by the known CRAM method. Further, embodiments of the presented method utilize a differentiable cost function, e.g. a log-barrier function, again in contrast to the CRAM method. The method smoothly traps high and small amplitudes of a signal into a desired range and also, to some extent, gracefully shapes them.

The provided methods and means may be utilized in a number of gradient-based optimization techniques, for improving their convergence techniques. In an aspect, an improved method for a projected gradient descent is provided.

Figure 1:
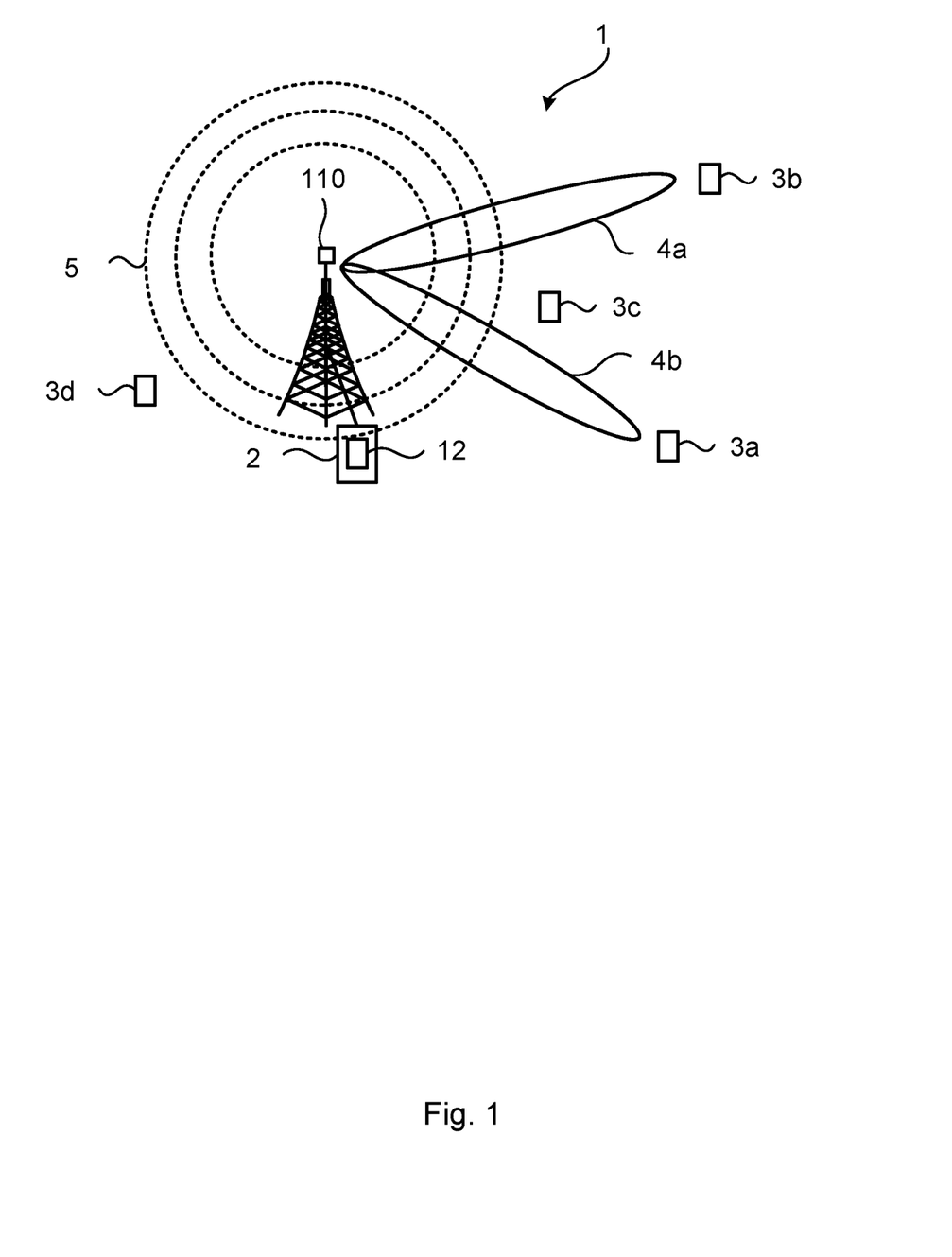
FIG. 1 illustrates a simplified diagram of a communication system comprising an access network node equipped with a precoder unit according to various embodiments.

FIG. 1 illustrates schematically an environment in which embodiments of the present disclosure may be implemented. In particular, a communication system 1, in particular a MIMO communication system 1, is shown in which embodiments presented herein can be applied. The communication system 1 comprises a transmission and reception point 110 configured to transmit precoded signals in beams 4a, 4b as well as broadcast signals 5 towards user equipment 3a, 3b, 3c, 3d.

Precoding is implemented in a precoder unit 12 provided in an access network node 2 operatively connected to the TRP 110. Further details of the precoder unit 12, the access network node 2, and the TRP 110 will be disclosed below. The precoding is applied so that signals with payload reach the intended receivers such as user equipment 3a and 3b shown in FIG. 1.

Figure 2:
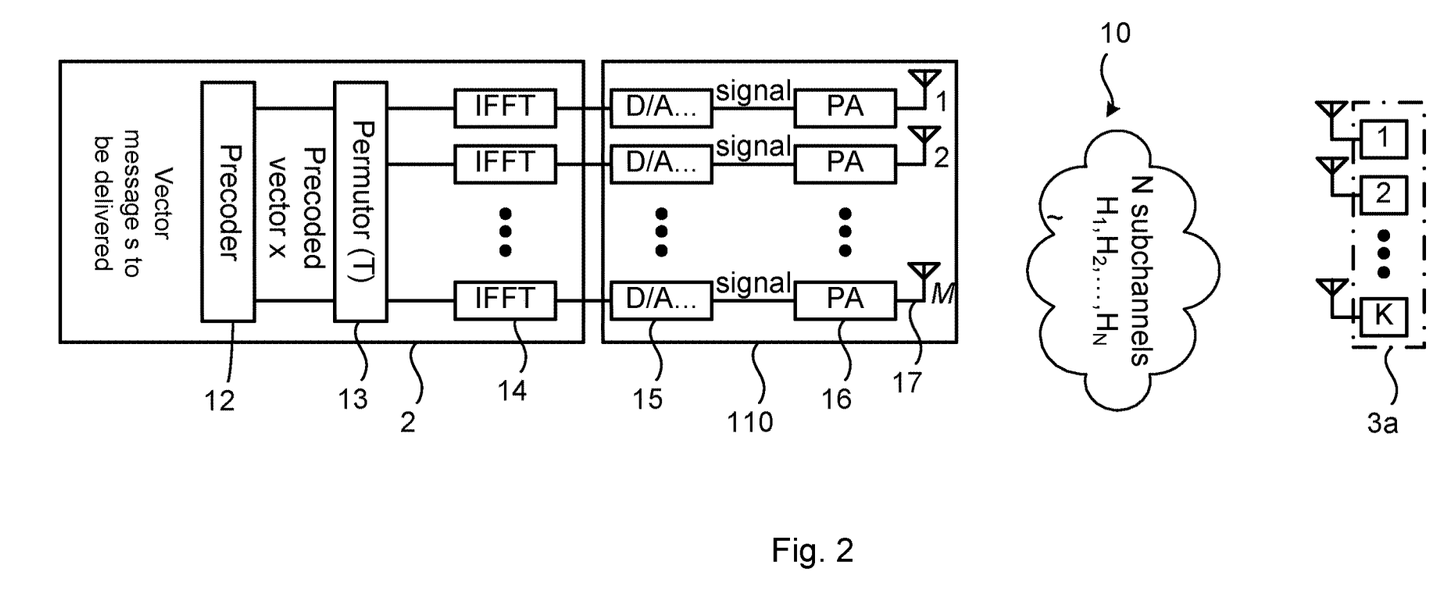
FIG. 2 illustrates a simplified block diagram of an access network node comprising a precoder unit.

FIG. 2 illustrates the MIMO communication system where the access network node 2 is shown in some more details. The access network node 2 comprises M antenna elements and intends to convey K<M layers of data to a user equipment 3a in the same time-frequency recourse by exploiting the spatial multiplexing. The radio propagation channel 10 is represented by $\tilde{N}$ flat-fading subchannels $H_n \in \mathbb{C}^{K \times M}$ for n=1, 2, ..., $\tilde{N}$. The access network node 2 is configured to use OFDM to increase the bandwidth efficiency and robustness to the multipath environment. To combat the high PAPR, the access network node 2, e.g. a base station (BS), is equipped with a base-band digital precoder unit 12. The access network node 2 comprises the precoder unit 12, a permutor 13, and an inverse fast Fourier transform (IFFT) bank 14. The access network node 2 is operatively connected to the TRP 110 comprising a digital-to-analog (D/A) converter bank 15, a power amplifier (PA) bank 16 and M antennas 17. It is noted that the access network node 2 as well as the TRP 110 may comprise further components conventionally used but omitted here for sake of brevity.

Let $s_n \in \mathbb{C}^K$ denote the K-th layer of data fed to the precoder unit 12 in n-th subcarrier, and N denote the number of subcarriers in an OFDM symbol. For the sake of clarity, all layers of data in an augmented vector of size KN are stacked so that $\tilde{s}=[s_1^T, s_2^T, \ldots, s_N^T]^T \in \mathbb{C}^{KN}$. On the other hand, let $x_n \in \mathbb{C}^M$ denote a precoded vector of all M transmit antennas corresponding to the n-th subcarrier. For the sake of brevity, define $\tilde{x}=[x_1^T, x_2^T, \ldots, x_N^T]^T \in \mathbb{C}^{MN}$ in a similar way. Moreover, a given permutation matrix T is defined to map the elements of precoded vector $\tilde{x}$ to the corresponding antenna elements. The baseband precoded vector $\tilde{x}$ goes through the inverse fast Fourier transform (IFFT) blocks and is finally propagated over N flat-fading subchannels $H_n \in \mathbb{C}^{K \times M}$ for n=1, 2, ..., N. In order to keep notation light, all propagation channels are stored into a big block diagonal matrix $\tilde{H}=\text{blkdiag}\{H_1, H_2, \ldots, H_N\} \in \mathbb{C}^{KN \times MN}$.

Assuming that full channel state information (CSI) is available at a transmitter side and that the BS2 designs a precoded vector $\tilde{x}$ so that the UEs receive a vector message $\tilde{s}$ $$\tilde{H}\tilde{x}=\tilde{s} \qquad (1)$$

In order to measure a mismatch between the desired received vector $\tilde{s}$ and the actual received vector $\tilde{H}\tilde{x}$ use is made of error vector magnitude (EVM) in percentage according to:

$$EVM = \frac{\|\tilde{H}\tilde{x} - \tilde{s}\|_2}{\|\tilde{s}\|_2} \times 100 \qquad (2)$$

A goal of the digital precoder unit is to keep the EVM below a certain level and ideally zero. Another goal is to combat the high dynamic range of OFDM symbols in the time domain. In order to ensure this, the precoded vector $\tilde{x}$ should be designed in a way to minimize the PAPR:

$$\min_{\tilde{x}} \frac{\|\tilde{F}^H T\tilde{x}\|_\infty^2}{\|\tilde{x}\|_2^2} \qquad (3)$$

where $\tilde{F}=\text{blkdiag}\{F_{N \times N}, F_{N \times N}, \ldots, F_{N \times N}\} \in \mathbb{C}^{MN \times MN}$ and $F_{N \times N}$ denotes the discrete Fourier transform matrix of size N×N associated with each antenna branch. Now, the goal of both PAPR and EVM can be express in the following optimization problem:

$$\min_{\tilde{x}} \frac{\|\tilde{F}^H T\tilde{x}\|_\infty^2}{\|\tilde{x}\|_2^2} \qquad (4)$$

$$\text{s.t. } \tilde{H}\tilde{x} = \tilde{s}.$$

The above optimization problem (4) is non-convex due to the convex-over-convex fractional cost function. Hence, it is common to drop the denominator off and instead minimize the maximum amplitude/power of the time domain samples:

$$\min_{\tilde{x}} \ \|\tilde{F}^H T\tilde{x}\|_\infty^2 \qquad (5)$$

$$\text{s.t. } \tilde{H}\tilde{x} = \tilde{s}.$$

Figure 3:
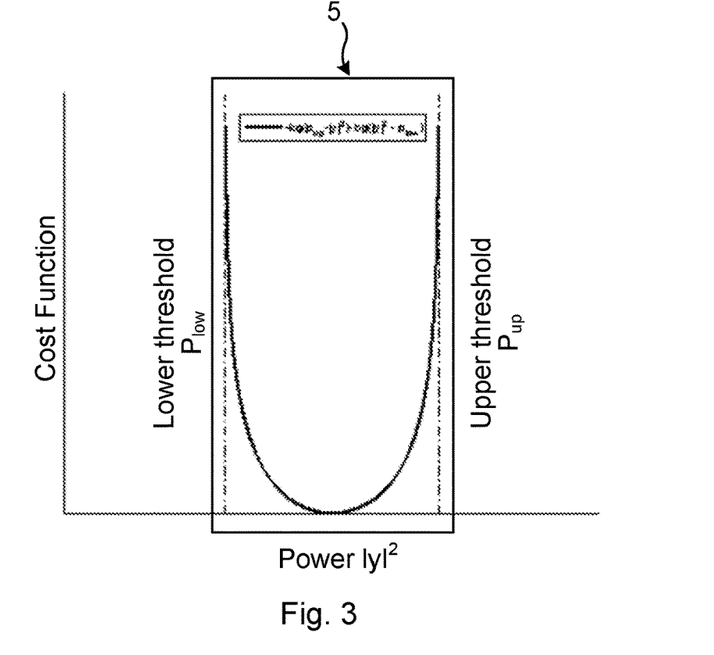
FIG. 3 is a log-barrier cost function restricting power of time domain samples between two thresholds.

FIG. 3 illustrates a log-barrier cost function restricting power of time domain samples between two thresholds: a lower threshold $P_{low}$ and an upper threshold $P_{up}$.

It is noted that, in general, the upper threshold $P_{up}$ may be any number between zero and infinity. A gradient-based technique is suggested herein for use. This technique may be interpreted as a soft clipping and shaping of a time domain signal.

In an aspect, the equation (5) is solved by using a modified and accelerated variation of a Projected Gradient Descent Method (PGDM). However, gradient-based techniques rely on the functions being differentiable. Therefore, in a first step the infinity norm in equation (5) is approximated, which equation is a highly non-differentiable function. The approximation is, in an embodiment, made by a log-barrier function, which results in a smooth and convex optimization problem:

$$\min_{\tilde{x}} \ \sum_{i=1}^{MN} -\ln\left(p_{up} - \left|\left[\tilde{F}^H T\tilde{x}\right]_i\right|^2\right) \qquad (6)$$

$$\text{s.t. } \tilde{H}\tilde{x} = \tilde{s}.$$

With reference to FIG. 3, it is noticed that the power of i-th time domain sample $|[\tilde{F}^H T\tilde{x}]_i|^2$ for i=1, 2, ... MN, keeps the distance from an upper threshold $p_{up}$ to reduce the value of log-barrier function. This can, in some embodiments, be done even more aggressively by restricting the power (amplitude) of time domain samples $|[\tilde{F}^H T\tilde{x}]_i|^2$ for i=1, 2, ..., MN, not only from the above $p_{up}$ but also from a lower threshold $p_{low}$ as shown in FIG. 3. As a result, the signal power (magnitude) can be confined in a box 5 between the lower threshold $p_{low}$ and the upper threshold $p_{up}$.

In an embodiment, the below log-barrier function is used as the cost function.

$$\min_{\tilde{x}} \ \sum_{i=1}^{MN} -\ln\left(p_{up} - \left|\left[\tilde{F}^H T\tilde{x}\right]_i\right|^2\right) + \sum_{i=1}^{MN} -\ln\left(\left|\left[\tilde{F}^H T\tilde{x}\right]_i\right|^2 - p_{low}\right) \qquad (7)$$

$$\text{s.t. } \tilde{H}\tilde{x} = \tilde{s}.$$

In another embodiment, the cost function (8) is as below:

$$\min_{\tilde{x}} \ \sum_{i=1}^{MN} -w_1 \ln\left(p_{up} - \left|\left[\tilde{F}^H T\tilde{x}\right]_i\right|^2\right) + \qquad (8)$$

$$\sum_{i=1}^{MN} -w_2 \ln\left(\left|\left[\tilde{F}^H T\tilde{x}\right]_i\right|^2 - p_{low}\right)$$

$$\text{s.t. } \tilde{H}\tilde{x} = \tilde{s}.$$

In the above cost function (8), the higher $w_2$ that is chosen, the higher cost function has to be paid for those samples that are closer to the upper power limit $p_{up}$, and as a result, this cost function (8) implicitly reduces the high peaks further down. On the other hand, the higher $w_1$ gives a higher cost to signals closer to the lower power limit $p_{low}$ and consequently tries to push them toward the higher magnitudes and results in lower PAPR, normally, at the cost of more average power. All in all, the cost functions according to various embodiments are more flexible than their counterpart in CRAM and have more flexibility on average power and peaks. Another important advantage is associated to the differentiability of the cost functions (7), (8) that enables the use of many different gradient-based optimization techniques. Next, embodiments are described by using one exemplary gradient descent method. However, it is noted that other gradient-based optimization techniques can be utilized instead.

In the above embodiments, the cost functions (6), (7) and (8) are given as examples and it is noted that in other embodiments still other cost functions may be used for implementing different embodiments of the method for reducing PAPR presented herein.

In the following, an iterative algorithm, PGDM, according to an aspect of the invention is described. The algorithm is initiated from a feasible point that satisfies the spatial constraint in equation (1). An example of such algorithm is ZF solution $\tilde{H}^+\tilde{s}$. Next, in each iteration the gradient of the cost function, e.g. equation (7), and project it to the constraint set $\tilde{H}\tilde{x}=\tilde{s}$, and take a step with proper length toward the direction which guarantees the zero-EVM. In order to accelerate the convergence rate, the gap between an upper threshold $p_{up}$ and a lower threshold $p_{low}$ is, in an embodiment, reduced at the end of each iteration in order to confine the dynamic range of time domain samples between $[p_{low}, p_{up}]$ and push it more toward the constant envelope signal. This infers that a new cost function is available in each iteration. For instance, instead of optimization problem equation (7), the following is available:

$$\min_{\tilde{x}} \ \sum_{i=1}^{MN} -\ln\left(p_{up}^{(k)} - \left|\left[\tilde{F}^H T\tilde{x}\right]_i\right|^2\right) + \sum_{i=1}^{MN} -\ln\left(\left|\left[\tilde{F}^H T\tilde{x}\right]_i\right|^2 - p_{low}^{(k)}\right) \qquad (9)$$

$$\text{s.t. } \tilde{H}\tilde{x} = \tilde{s}.$$

where in each iteration the interval $[p_{low}^{(k)}, p_{up}^{(k)}]$. The described iterative algorithm can be described in a mathematical way as:

$$\tilde{y}^{(k+1)} = \tilde{y}^{(k)} + \alpha \Delta \tilde{y}^{(k)}, \qquad (10)$$

where $\tilde{y}^{(k)}$ denotes time-domain samples in iteration k, $\Delta \tilde{y}^{(k)}$ is a step toward the descent direction to reduce PAPR and $\alpha$ determines the step length toward the descent direction. For instance, the step length $\alpha$ may be determined using line-search methods such as weak/strong Wolfe conditions, backtracking or the like.

Using the concept of PGDM, the following is suggested:

$$\Delta \tilde{y}^{(k)} = -\alpha \tilde{F}^H T(I - \tilde{H}^\dagger \tilde{H}) T^H \tilde{F} \Lambda_2^{(k)} \Lambda_1^{(k)} \tilde{y}^{(k)}$$

The above results in the following iterative algorithm:

$$\tilde{y}^{(k+1)} = \tilde{y}^{(k)} - \alpha \tilde{F}^H T(I - \tilde{H}^\dagger \tilde{H}) T^H \tilde{F} \Lambda_2^{(k)} \Lambda_1^{(k)} \tilde{y}^{(k)} \qquad (11)$$

It is noted that the vector $\Lambda_1^{(k)} \tilde{y}^{(k)}$ is the gradient of cost function at the k-th iteration, by defining the diagonal matrix $\Lambda_1^{(k)} \in \mathbb{C}^{MN \times MN}$ as below:

$$\Lambda_1^{(k)} = \begin{bmatrix} \ddots & & \\ & \frac{2}{p_{up}^{(k)} - |\tilde{y}_i^{(k)}|^2} + \frac{2}{p_{low}^{(k)} - |\tilde{y}_i^{(k)}|^2} & \\ & & \ddots \end{bmatrix} \qquad (12)$$

The matrix $\Lambda_2^{(k)} \in \mathbb{C}^{MN \times MN}$ is an optional preconditioner matrix for accelerating the convergence and combat the ill-conditioned situation if need occurs. It may be assumed that $\Lambda_2^{(k)}$ is the inverse of Hessian matrix.

It is noted that the described differentiable cost function can be utilized by several different gradient-based optimization techniques, and consequently, benefits of their convergence techniques. In this application, the projected gradient descent method with some modification is used for describing the various embodiments. However, the present teachings and modification can be deduced to other gradient-based techniques such as, for instance, Newton's step (also known as Newton's method or Newton-Raphson's method, gradient descent with momentum, gradient descent with RMSprop (root mean square propagation), gradient descent with Adam (adaptive moment estimation, conjugate gradient descent, mirror decent techniques, etc.

In the following, an algorithm according to various embodiments is described, in which oversampling is used. Without oversampling, the actual continuous-time peak power may be significantly higher that the discrete-time estimate. Hence, to take oversampling into account is highly advantageous and omitting the oversampling may in fact deteriorate the actual PAPR performance. In the following a modification of the described PGDM algorithm is, in different embodiments, provided. The modification enables the PGDM algorithm to function well even with oversampling conditions. In order to do this modification, the algorithm is started from a feasible point, such as e.g. $\tilde{H}^{\dagger}\tilde{s}$ in the frequency domain. However, in this case the vector $\tilde{H}^{\dagger}\tilde{s}$ should be zero-padded L times in the frequency domain, and consequently, its time-domain signal would have been oversampled L times more. Further, permutations, i.e. T, $T^H$, FFT and IFFT operations (i.e. F, $F^H$), are made on the L times oversample rate, while the projection onto the null-space (i.e., $I-\tilde{H}^{\dagger}\tilde{H}$) remains in the original sample rate. The below iterative algorithm shows the modified algorithm (PGDM) which takes oversampling issues into account:

$$\underbrace{\tilde{y}^{k+1}}_{\text{unsampled rate}} = \underbrace{\tilde{y}^{(k)}}_{\text{upsampled rate}} - \underbrace{\alpha \tilde{F}^H T}_{\text{upsampled rate}} \underbrace{\left(I - \tilde{H}^{\dagger}\tilde{H}\right)}_{\text{original rate}} \underbrace{T^H \tilde{F} \Lambda_2^{(k)} \Lambda_1^{(k)} \tilde{y}^{(k)}}_{\text{upsampled rate}}. \quad (13)$$

Figure 4:
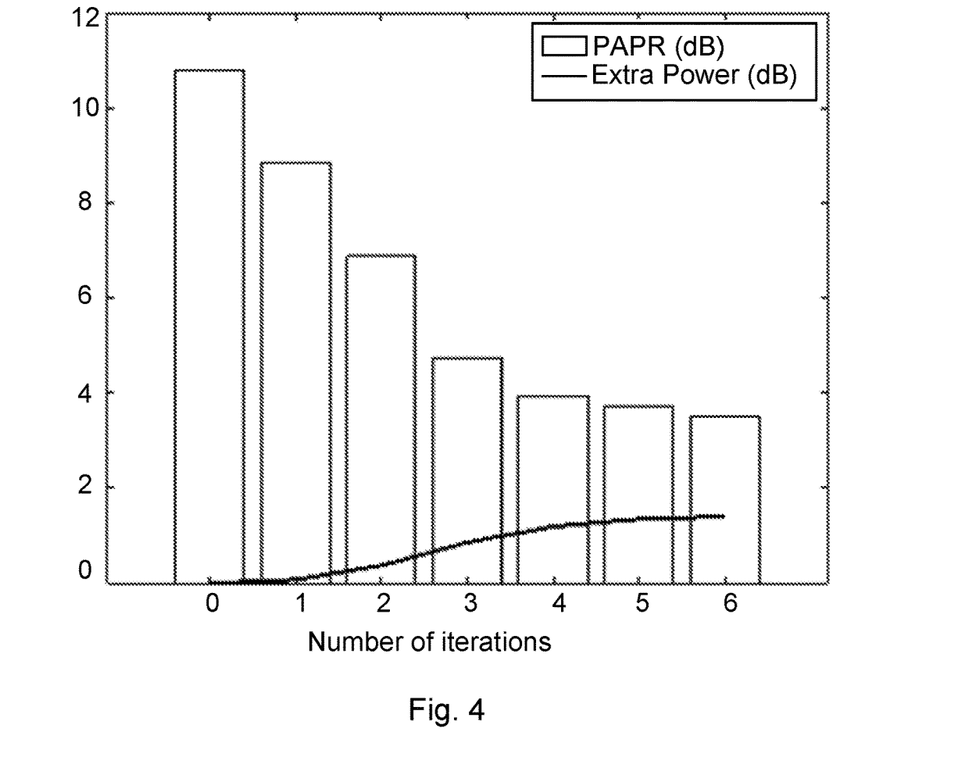
FIG. 4 illustrates performance of the herein proposed iterative algorithm, in various embodiments, over a Rayleigh fading channel.

FIG. 4 illustrates performance of the herein provided iterative algorithm over a Rayleigh fading channel, and in particular achieved PAPR and extra rms power imposed by the herein proposed iterative algorithm in each iteration. Assuming N=1200 subcarriers, M=64 antennas at the access network node, K=2 layers of 16-QAM (Quadrature Amplitude Modulation) data, and L=4 times oversampling. As has been shown, the more the algorithm iterates, the better PAPR can be achieved (until reaching out a saturation level), while the EVM introduced by the algorithm is zero. FIG. 4 also reveals that the better PAPR comes at the price of an extra power compared to the ZF-solution. However, it is noted that the ZF solution has the minimum average power among all precoders, but suffers from a high PAPR, about 11-12 dB. It is noted that although a Rayleigh fading channel was used as an illustrative example, the method and devices provided are not limited to a Rayleigh fading channel.

The simulation results corroborate that the herein provided algorithm can provide a different (e.g. faster) convergence rate compared to the known CRAM.

Figure 5:
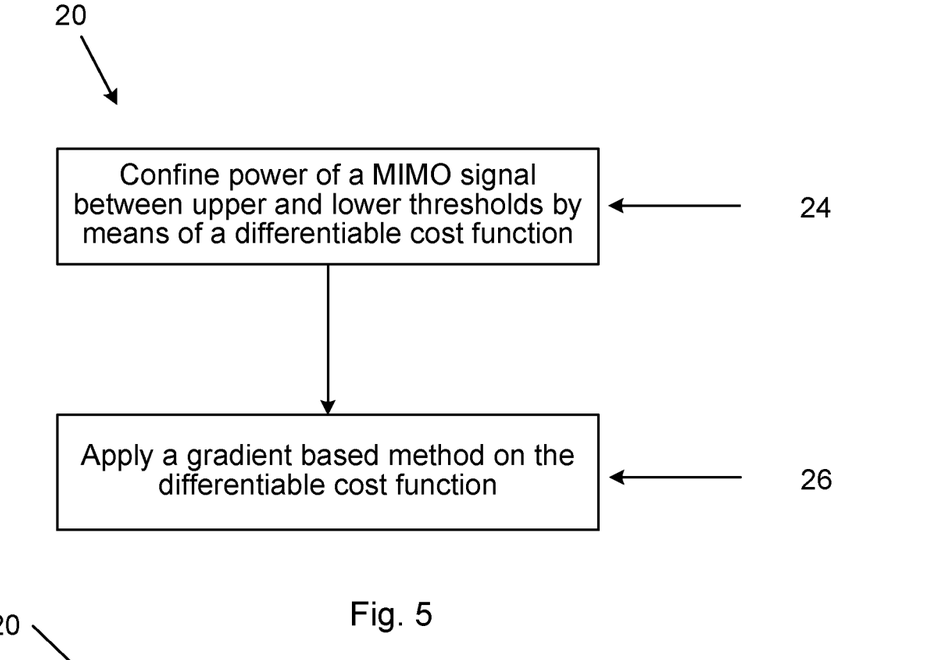
FIG. 5 is a flowchart of methods according to embodiments.

FIG. 5 is a flowchart illustrating embodiments of methods for reducing PAPR in a MIMO communication system. The methods are performed by the precoder unit 12, which may be comprised in an access network node of the MIMO communications system. Various embodiments of the methods may advantageously be implemented in and provided as computer programs. A method 20 is thus provided for reducing PAPR in a MIMO communication system. A massive MIMO communication system, where the number of antennas at an access network node is higher than the number of antennas at a UE (number of data layers), is a particular example on a system that highly benefits from the herein presented methods.

The method 20 comprises confining 24 power of a MIMO signal by a differentiable cost function. As noted earlier, the upper threshold $P_{up}$ may be infinity for some applications.

The method 20 comprises applying 26 iteratively a gradient method on the differentiable cost function until reaching a set power target for the MIMO signal, while keeping an Error Vector Magnitude, EVM, below a set EVM level.

As has been noted earlier, the presented method 20 offer more flexibility on PAPR reduction, on convergence rate and on average power control compared to the known CRAM methods. Further, the method 20 is usable for any oversampling rate.

Figure 6:
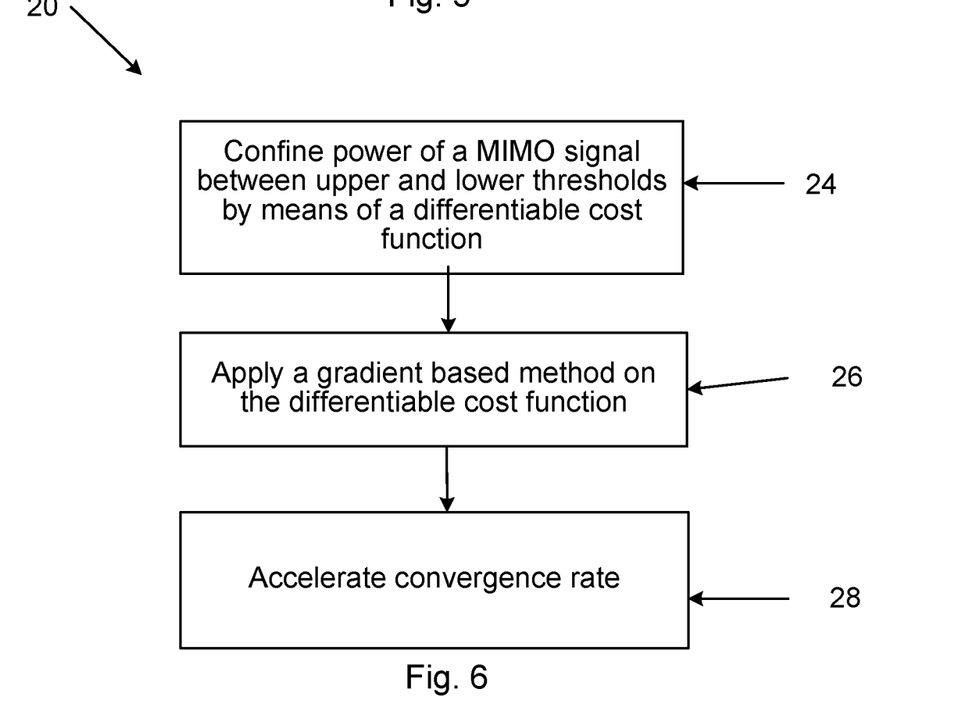
FIG. 6 is a flowchart of methods according to embodiments.

FIG. 6 is a flowchart illustrating embodiments of methods for reducing PAPR in a MIMO communication system.

As in the embodiment described in relation to FIG. 5, the method 20 comprises confining 24 power of a MIMO signal by a differentiable cost function. For cost functions having an upper limit, the upper threshold $P_{up}$ may, for some applications, be infinity.

The method 20 comprises applying 26 a gradient method on the differentiable cost function until reaching a set power target for the MIMO signal, while keeping an Error Vector Magnitude, EVM, below a set EVM level.

In an embodiment, the method 20 comprises setting the power target to a minimum of the differentiable cost function.

In various embodiments, the differentiable cost function is a convex function or a quasi-convex function.

In various embodiment, the method 20 comprises accelerating 28 a convergence rate of the gradient by modifying the cost function after each iteration, such that in each iteration the cost function penalizes samples having highest power and/or samples having lowest power the most.

In various embodiments the differentiable cost function is a logarithmic barrier cost function. This is noted that this is merely one of a number of functions that may be used. Other examples comprise Softmax function and Huber function, but various other functions may be used as well.

In various embodiments, the gradient method is or is based one of: projected gradient descent method, Newton's method, conjugate gradient descent or a mirror descent technique. It is noted that there are several alternative and variations here, and several other convex or quasi-convex functions may be used.

In various embodiments, the gradient method comprises a projected gradient descent method according to:

$$\tilde{y}^{(k+1)} = \tilde{y}^{(k)} + \alpha \Delta \tilde{y}^{(k)},$$

where $\tilde{y}^{(k)}$ denotes the time-domain samples of the MIMO signal in iteration k, $\Delta \tilde{y}^{(k)}$ is a step toward a descent direction to reduce the PAPR, and $\alpha$ determines a step length toward the descent direction, and wherein the confining 24 comprises modifying the cost function for each iteration.

In variations of the above set embodiments, the method comprises accelerating a convergence rate of the gradient method by modifying the cost function for each iteration. For cost functions that use upper and lower thresholds, the modifying may e.g. comprise reducing the distance between the upper threshold $P_{up}$ and the lower threshold $P_{low}$ after each iteration of the gradient method. However, it is noted that reducing the PAPR does not necessarily result in the lowest samples being higher than $P_{low}$.

In various embodiments the differentiable cost function comprises:

$$\min_{\tilde{x}} \sum_{i=1}^{MN} -\ln\left(p_{up} - \left|[\tilde{F}^H T \tilde{x}]_i\right|^2\right) + \sum_{i=1}^{MN} -\ln\left(\left|[\tilde{F}^H T \tilde{x}]_i\right|^2 - p_{low}\right)$$

s.t. $\tilde{H}\tilde{x} = \tilde{s}$.

where $\tilde{x}$ represents a frequency-domain precoded signal, $|[\tilde{F}^H T \tilde{x}]_i|^2$ for i=1, 2, ..., MN is power of i-th time domain sample of the signal, $\tilde{H}$=blkdiag{$H_1, H_2, \ldots, H_N$} $\in \mathbb{C}^{KN \times MN}$, comprises propagation channels, and $\tilde{s}$ is a vector message to be delivered to a user device 3a, 3b, 3c, 3d.

In variations of the above set of embodiments, the confining comprises confining the power of the MIMO signal to be between a lower threshold, $P_{low}$, and an upper threshold, $P_{up}$, and comprising reducing distance between the upper threshold $P_{up}$ and the lower threshold $P_{low}$ after each iteration of the gradient method.

Figure 7:
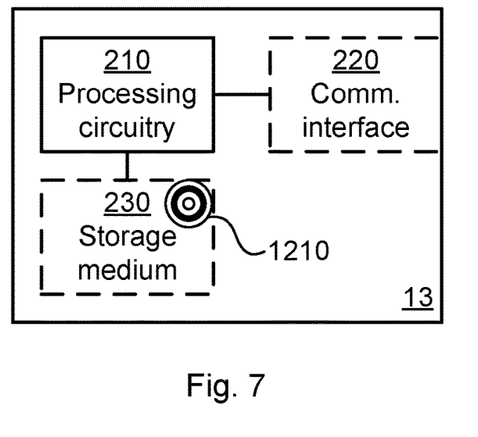
FIG. 7 is a schematic diagram showing functional units of a precoder unit according to an embodiment.
Figure 9:
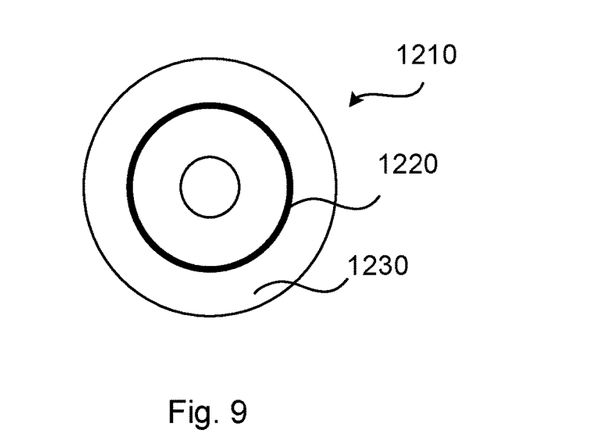
FIG. 9 shows one example of a computer program product comprising computer readable storage medium according to an embodiment.

FIG. 7 schematically illustrates, in terms of a number of functional units, the components of a precoder unit 12 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210 (as shown in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the precoder unit 12 to perform a set of operations, or steps, as disclosed herein. For example, the storage medium 230 may store the set of operations, and the processing circuitry 210 may be configured to retrieve the set of operations from the storage medium 230 to cause the precoder unit 12 to perform the set of operations. The set of operations may be provided as a set of executable instructions.

The processing circuitry 210 is thereby arranged to execute methods as disclosed herein. The storage medium 230 may also comprise persistent storage, which, for example, can be any single one or combination of magnetic memory, optical memory, solid state memory or even remotely mounted memory. The precoder unit 12 may further comprise a communications interface 220 at least configured for communications with other entities, functions, nodes, and devices. As such the communications interface 220 may comprise one or more transmitters and receivers, comprising analogue and digital components. The processing circuitry 210 controls the general operation of the precoder unit 12 e.g. by sending data and control signals to the communications interface 220 and the storage medium 230, by receiving data and reports from the communications interface 220, and by retrieving data and instructions from the storage medium 230. Other components, as well as the related functionality, of the precoder unit 12 are omitted in order not to obscure the concepts presented herein.

Figure 8:
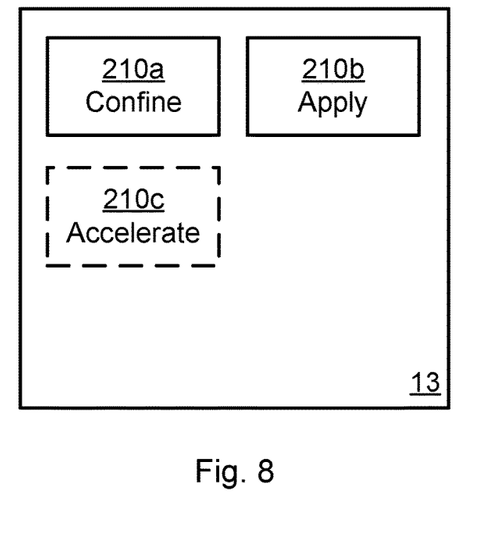
FIG. 8 is a schematic diagram showing functional modules of a precoder unit according to an embodiment.

FIG. 8 schematically illustrates, in terms of a number of functional modules, the components of a precoder unit 12 according to an embodiment. The precoder unit 12 of FIG. 8 comprises a number of functional modules: an obtain module 210a configured to perform step 24, and a determine module 210b configured to perform step 26. The precoder unit 12 of FIG. 9 may further comprise a number of optional functional modules, such as an accelerate module 210c configured to perform step 28. In general terms, each functional module 210a:210c may in one embodiment be implemented only in hardware and in another embodiment with the help of software, i.e., the latter embodiment having computer program instructions stored on the storage medium 230 which when run on the processing circuitry makes the precoder unit 12 perform the corresponding steps mentioned e.g. in conjunction with FIG. 6 or 7. It should also be mentioned that even though the modules correspond to parts of a computer program, they do not need to be separate modules therein, but the way in which they are implemented in software is dependent on the programming language used. Preferably, one or more or all functional modules 210a:210c may be implemented by the processing circuitry 210, possibly in cooperation with the communications interface 220 and/or the storage medium 230. The processing circuitry 210 may thus be configured to from the storage medium 230 fetch instructions as provided by a functional module 210a:210c and to execute these instructions, thereby performing any steps as disclosed herein.

The precoder unit 12 may be provided as a standalone device or as a part of at least one further device. For example, the precoder unit 12 may be provided in a network node, such as the access network node 2. Alternatively, functionality of the precoder unit 12 may be distributed between at least two devices, or nodes. These at least two nodes, or devices, may either be part of the same network part (such as a radio access network or a core network) or may be spread between at least two such network parts. In general terms, instructions that are required to be performed in real time may be performed in a device, or node, operatively closer to the cell than instructions that are not required to be performed in real time.

Thus, a first portion of the instructions performed by the precoder unit 12 may be executed in a first device, and a second portion of the instructions performed by the precoder unit 12 may be executed in a second device; the herein disclosed embodiments are not limited to any particular number of devices on which the instructions performed by the precoder unit 12 may be executed. Hence, the methods according to the herein disclosed embodiments are suitable to be performed by a precoder unit 12 residing in a cloud computational environment. Therefore, although a single processing circuitry 210 is illustrated in FIG. 7 the processing circuitry 210 may be distributed among a plurality of devices, or nodes. The same applies to the functional modules 210a:210c of FIG. 8 and the computer program 1220 of FIG. 9.

FIG. 9 shows one example of a computer program product 1210 comprising computer readable storage medium 1230. On this computer readable storage medium 1230, a computer program 1220 can be stored, which computer program 1220 can cause the processing circuitry 210 and thereto operatively coupled entities and devices, such as the communications interface 220 and the storage medium 230, to execute methods according to embodiments described herein. The computer program 1220 and/or computer program product 1210 may thus provide means for performing any steps as herein disclosed.

In the example of FIG. 9, the computer program product 1210 is illustrated as an optical disc, such as a CD (compact disc) or a DVD (digital versatile disc) or a Blu-Ray disc. The computer program product 1210 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220 is here schematically shown as a track on the depicted optical disk, the computer program 1220 can be stored in any way which is suitable for the computer program product 1210.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for reducing peak-to-average power ratio, PAPR, in a Multiple Input Multiple Output, MIMO, communication system, the method being performed in a precoder unit and comprising:
confining power of a MIMO signal by a differentiable cost function, and
applying iteratively a gradient method on the differentiable cost function until reaching a set power target for the MIMO signal, while keeping an Error Vector Magnitude, EVM, below a set EVM level.

2. The method as claimed in claim 1, comprising setting the minimum of the differentiable cost function to the power target.

3. The method as claimed in claim 1, wherein the differentiable cost function is a convex function or a quasi-convex function.

4. The method as claimed in claim 1, comprising accelerating a convergence rate of the gradient method by modifying the cost function after each iteration, such that in each iteration the cost function penalizes samples having highest power and/or samples having lowest power the most.

5. The method as claimed in claim 1, wherein the differentiable cost function is one of: a logarithmic barrier cost function, Softmax function and Huber function.

6. The method as claimed in claim 1, wherein the gradient method is or is based one of: projected gradient descent method, gradient descent with momentum, gradient descent with RMSprop, gradient descent with Adam, Newton's method, conjugate gradient descent or a mirror descent technique.

7. The method as claimed in claim 1, wherein the gradient method comprises a projected gradient descent method according to:

$$\tilde{y}^{(k+1)} = \tilde{y}^{(k)} + a\Delta\tilde{y}^{(k)},$$

where $\tilde{y}^{(k)}$ denotes the time-domain samples of the MIMO signal in iteration k, $\Delta\tilde{y}^{(k)}$ is a step toward a descent direction to reduce the PAPR, and $\alpha$ determines a step length toward the descent direction, and wherein the confining comprises modifying the cost function for each iteration.

8. The method as claimed in claim 7, comprising accelerating a convergence rate of the gradient method by reducing distance between the upper threshold $P_{up}$ and the lower threshold $P_{low}$ after each iteration of the gradient method.

9. The method as claimed in claim 1, wherein the differentiable cost function comprises:

$$\min_{\tilde{x}} \sum_{i=1}^{MN} -\ln\left(p_{up} - \left|\left[\tilde{F}^H T\tilde{x}\right]_i\right|^2\right) + \sum_{i=1}^{MN} -\ln\left(\left|\left[\tilde{F}^H T\tilde{x}\right]_i\right|^2 - p_{low}\right),$$

s.t. $\tilde{H}\tilde{x} = \tilde{s}.$ where $\tilde{x}$ represents a frequency-domain precoded signal, $|[\tilde{F}^H T\tilde{x}]_i|$ for i=1, 2, . . . , MN is power of i-th time domain sample of the signal, $\tilde{H}$=blkdiag{$H_1$, $H_2$, . . . , $H_N$}$\in \mathbb{C}^{KN \times MN}$ comprises propagation channels, $P_{low}$ is a lower threshold, $P_{up}$ an upper threshold and $\tilde{s}$ is a vector message to be delivered to user devices.

10. The method as claimed in claim 9, wherein the confining comprises confining the power of the MIMO signal to be between a lower threshold, $P_{low}$, and an upper threshold, $P_{up}$, and comprising reducing distance between the upper threshold $P_{up}$ and the lower threshold $P_{low}$ after each iteration of the gradient method.

11. A precoder unit for reducing peak-to-average power ratio, PAPR, in a Multiple Input Multiple Output, MIMO, communication system, the precoder unit being configured to:
confine power of a MIMO signal by a differentiable cost function, and
apply iteratively a gradient method on the differentiable cost function until reaching a set power target for the MIMO signal, while keeping an Error Vector Magnitude, EVM, below a set EVM level.

12. The precoder unit as claimed in claim 11, comprising an accelerate component configured to accelerate a convergence rate of the gradient method by modifying the cost function after each iteration, such that in each iteration the cost function penalizes samples having highest power and/or samples having lowest power the most.

13. The precoder unit as claimed in claim 11, further being configured to perform further operations comprising to set the minimum of the differentiable cost function to the power target.

14. The precoder unit as claimed in claim 11, wherein the differentiable cost function is a convex function or a quasi-convex function.

15. The precoder unit as claimed in claim 11 configured to perform further operations comprising to accelerate a convergence rate of the gradient method by modifying the cost function after each iteration, such that in each iteration the cost function penalizes samples having highest power and/or samples having lowest power the most.

16. The precoder unit as claimed in claim 11, wherein the differentiable cost function is one of: a logarithmic barrier cost function, Softmax function and Huber function.

17. The precoder unit as claimed in claim 11, wherein the gradient method is or is based one of: projected gradient descent method, gradient descent with momentum, gradient descent with RMSprop, gradient descent with Adam, Newton's method, conjugate gradient descent or a mirror descent technique.

18. The precoder unit as claimed in claim 11, wherein the gradient method comprises a projected gradient descent method according to:

$$\tilde{y}\hat{} = \tilde{y}\hat{} + \alpha\Delta\tilde{y}\hat{}((k)),$$

where $\tilde{y}\hat{}((k))$ denotes the time-domain samples of the MIMO signal in iteration k, $\Delta\tilde{y}\hat{}((k))$ is a step toward a descent direction to reduce the PAPR, and a determines a step length toward the descent direction, and wherein the confining comprises modifying the cost function for each iteration.

19. The precoder unit as claimed in claim 18, comprising accelerating a convergence rate of the gradient method by reducing distance between the upper threshold Pup and the lower threshold Plow after each iteration of the gradient method.

20. An access network node, the access network node comprising a precoder unit being configured to:
confine power of a MIMO signal by a differentiable cost function, and
apply iteratively a gradient method on the differentiable cost function until reaching a set power target for the MIMO signal, while keeping an Error Vector Magnitude, EVM, below a set EVM level.

* * * * *